United States Patent [19]
Yasuda et al.

[11] Patent Number: 5,227,150
[45] Date of Patent: Jul. 13, 1993

[54] METHOD FOR CONTINUOUSLY MANUFACTURING RED LEAD

[75] Inventors: Hiroshi Yasuda; Kazuyoshi Yonezu; Katsuhiro Takahashi; Kenzo Yamamoto, all of Toyohashi, Japan

[73] Assignee: Matsushita Electronics Corporation, Ltd., Osaka, Japan

[21] Appl. No.: 918,938

[22] Filed: Jul. 22, 1992

Related U.S. Application Data

[63] Continuation of Ser. No. 698,715, May 10, 1991, abandoned.

[51] Int. Cl.⁵ .............................................. C01G 21/02
[52] U.S. Cl. ................................................... 423/620
[58] Field of Search ...................................... 423/620

[56] References Cited

U.S. PATENT DOCUMENTS

| | | | |
|---|---|---|---|
| 1,382,282 | 6/1921 | Gabel | 423/620 |
| 1,770,777 | 7/1930 | Haynes . | |
| 1,992,395 | 2/1935 | Rose et al. | 423/620 |
| 2,233,302 | 2/1941 | Aitken | 423/620 |
| 4,521,399 | 6/1985 | McKinney | 423/620 |

FOREIGN PATENT DOCUMENTS 2160366 6/1990 Japan .
91-197392 5/1991 Japan .

OTHER PUBLICATIONS

Inventor: Hiroshi Yasuda et al. Filing Date: Dec. 12, 1989.

*Primary Examiner*—Wayne Langel
*Attorney, Agent, or Firm*—Ratner & Prestia

[57] ABSTRACT

This invention relates to a method and apparatus to continuously manufacture red lead which is a primary material used to produce storage batteries, anticorrosion paint, glass, etc. In this method, lead monoxide and metal lead powder are continuously supplied from an inlet of a rotating inner cylinder which acts as a reaction chamber of a rotary kiln. The powder mixture proceeds toward the outlet of the kiln while it is oxidized into red lead. The yield of red lead, and the stable oxidation of raw material into red lead, can be accomplished by returning a part of the product powder available at the outlet to the inlet of the kiln.

3 Claims, 1 Drawing Sheet

METHOD FOR CONTINUOUSLY MANUFACTURING RED LEAD

This application is a continuation of application Ser. No. 07/698,715 filed May 10, 1991, abandoned.

BACKGROUND OF THE INVENTION

This invention relates to a method and apparatus to continuously manufacture red lead ($Pb_3O_4$) which is a primary material used to produce storage batteries, anti-corrosion paint, glass, etc.

Metal oxide such as red lead is manufactured by a continuous manufacturing apparatus wherein raw metal lead is oxidized in a heated air atmosphere. The important part of the continuous manufacturing apparatus is a rotary kiln having a rotating inner cylinder which is a cylindrical reaction chamber disposed at a slightly slanted horizontal position and is rotated at a low speed.

The raw metal material is continuously supplied from an inlet port of the rotating inner cylinder. The inlet port is provided at the higher end of the cylinder, since the cylinder is slanted horizontally. Since the rotating inner cylinder of the kiln is heated at high temperature by an internal or external heating means, the metal material is oxidized as it gradually proceeds from the inlet port toward an outlet port provided at the other lower end of the cylinder where the oxidized product is continuously retrieved. Both the inlet and outlet of the rotating inner cylinder are conventionally protected by respective hood means.

This apparatus is provided with not only a heating means to oxidize the raw material at high temperature, but a high-volume air supplying means capable of supplying air at a rate thirty times that actually needed for oxidation. The air supplying means is also capable of introducing high-volume local cooling air in order to prevent overheating of the raw material due to excessive heat of reaction.

Conventionally, red lead is manufactured by baking lead monoxide at about 450° C. Lead monoxide is manufactured by oxidizing metal lead powder. Mass production of lead monoxide is performed by using a ballmill or Barton-pot type lead powder manufacturing device where lead powder is air-oxidized. However, the lead monoxide manufactured by this method inevitably contains 10 to 30% unoxidized metal lead powder.

When lead monoxide, containing metal lead powder in such amounts, is turned onto red lead using the above mentioned continuous oxidizing apparatus, the unoxidized lead powder releases large amounts of heat upon oxidization. The yield of red lead in such a situation is extremely low because of the inadequate capability of the apparatus to control this abrupt generation of reaction heat. Therefore, lead monoxide has to be prepared through an independent apparatus wherein remaining metal lead powder is gradually oxidized.

DISCLOSURE OF THE INVENTION

The present invention solves the above-mentioned drawbacks associated with a conventional red lead manufacturing apparatus. More specifically, the invention offers a new continuous red lead manufacturing apparatus of higher red lead yield, to which lead monoxide material containing more than 10% metal lead powder can be supplied, eliminating the need for an independent metal lead oxidizing device.

In other words, this is to offer a new method and apparatus enabling stable and continuous production of red lead. Lead monoxide powder containing metal lead powder is continuously supplied into the inlet port of the rotating inner cylinder of the kiln. The lead monoxide powder containing metal lead powder is continuously turned into red lead as it is heated, oxidized, and transported toward the outlet port of the rotating inner cylinder of the kiln. Finally, a part of product available at the outlet port is returned to the inlet port of the kiln.

The product powder returned to the inlet port should be very fine and light weight powder having an average particle size of about one micron, which is caught by a dust collecting bag-filter provided at the outlet port. Thus, the product powder available at the outlet port of the rotary kiln, or the powder caught by the bag filter, contains only red lead and lead monoxide powder containing very little metal lead powder because it has been oxidized thoroughly in the rotating inner cylinder of the kiln.

By returning a part of the product powder to the inlet, the metal lead density in the raw material can be effectively reduced, and the reaction heat caused by abrupt oxidation of metal lead powder can be suppressed. The product powder containing a fair amount of red lead is in a stable condition at the vicinity of the outlet port where it is in an elevated temperature state, as high as 450° C.

When raw material containing metal lead powder is oxidized, it may cause an abnormal temperature rise, as high as 500° C., because of its abrupt oxidizing reaction. However, if a part of the product powder is returned to the inlet, the red lead contained therein would be dissociated again into lead monoxide at such a high temperature, producing an endothermic reaction. This should lower the overall temperature of the material and stabilize the kiln temperature.

Moreover, the finer the powder returned to the inlet, the greater the above effect for the same amount of returned powder. The reason for this is that the finer the powder, the more even a dispersion of it in the raw material.

The powder caught by a bag-filter provided at the outlet port is well suited to attain the above cited objects because the average size of such caught powder is less than one micron.

Although the amount of red lead contained in the product powder caught by the bag-filter is less than that contained in the powder available at the outlet, it also contains very little metal lead powder. Although the effect available by the endothermic reaction using bag filter product is less than that available by using outlet product, this is compensated for by the fact that the bag filter product is a finer powder.

THE EMBODIMENTS OF THE INVENTION

An embodiment of the invention is now explained by referring to a manufacturing apparatus of the invention.

Figure 1:
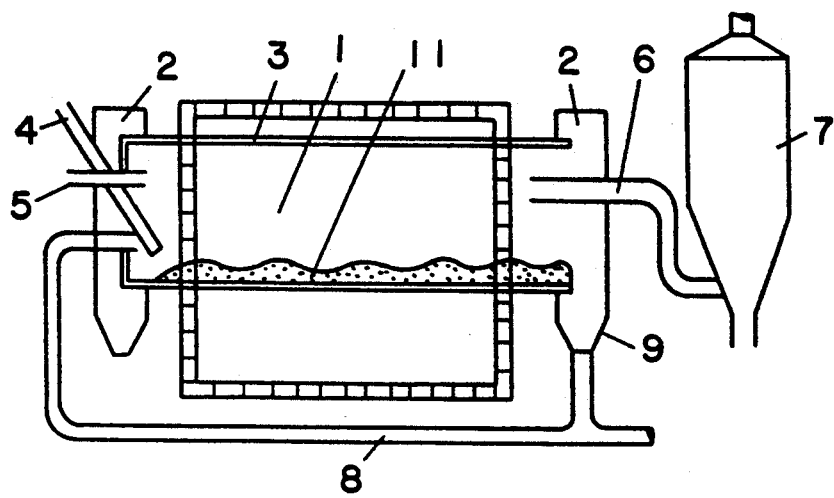
FIG. 1 shows an outline of the red lead manufacturing apparatus of the invention.

An outline of a red lead manufacturing apparatus of the invention is shown in FIG. 1, wherein 3 is a rotating inner cylinder of a kiln acting as a reaction chamber, consisting of a cylindrical furnace 1, the two ends of which are covered by respective hoods 2. While a pipe-shaped lead powder supplying inlet 4 and an air inlet duct 5 are provided at the inlet port, an air exhaust duct 6, and a bag-filter 7 connected thereto, are provided at the outlet port.

As a means to return a part of the product powder to the inlet port, an end of conveyer pipe 8 is connected to the product outlet 9 provided at the bottom of outlet hood 2. The other end of the conveyer pipe 8 is connected to the inlet port of the rotating inner cylinder 3.

Figure 2:
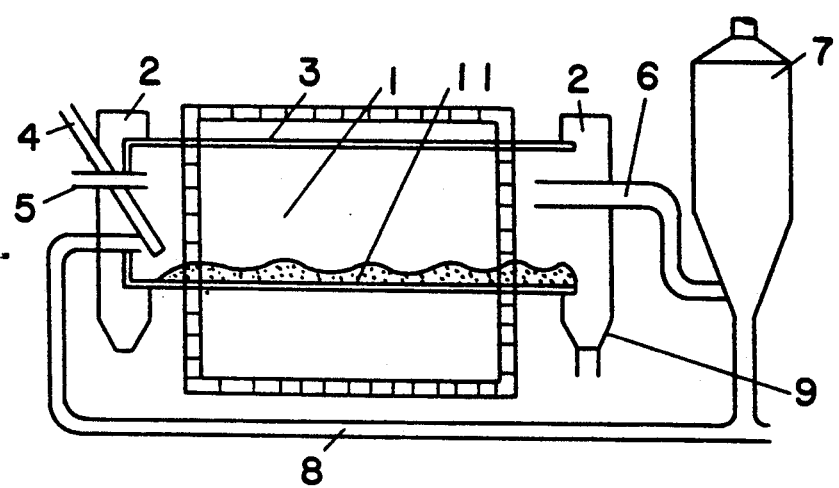
FIG. 2 shows another red lead manufacturing apparatus of the invention.

FIG. 2 shows another red lead manufacturing apparatus of the invention. In this embodiment, an end of conveyer pipe 8 shown in FIG. 1 is connected to the lower end of the bag filter 7, while the other end of the conveyer pipe 8 is connected to the inlet port of rotating inner cylinder 3. The air inlet duct 5 and air exhaust duct 6 are provided in order to supply the air necessary to oxidize the lead powder supplied into the furnace and to control the furnace temperature.

In manufacturing red lead by using the manufacturing apparatus of the present invention, raw lead powder material II consisting of lead monoxide of 60 to 90% and metal lead powder of the rest (10 to 40%) is supplied to the rotating inner cylinder 3 through the inlet port. A portion of the product powder from the outlet 9, or a part of the fine powder caught by the bag filter 7, is returned to the inlet port of the kiln through a conveyer pipe 8 from either the product outlet 9 or the bag filter 7.

A higher yield of red lead is achieved by using a higher recycle ratio of: the powder returned through the conveyer pipe 8 into the rotating inner cylinder 3 of the kiln; to raw lead powder feed. However, this effect may reach a maximum at a certain level of powder returned to the inlet of the kiln through the conveyer pipe 8, after which the yield of red lead may not increase with increasing recycle ratio.

Figure 3:
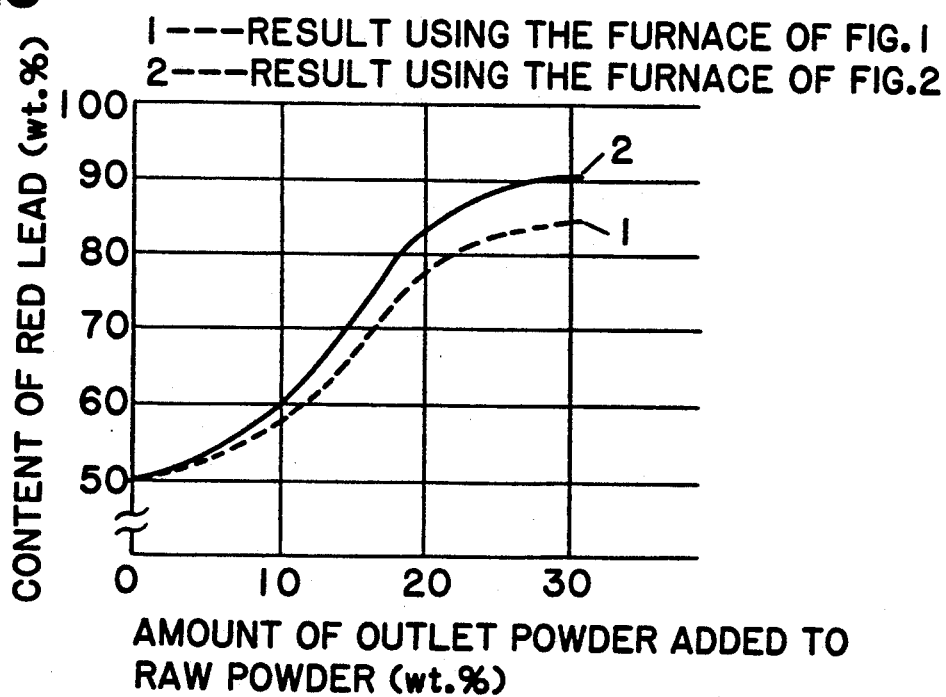
FIG. 3 shows a typical yield of red lead attained by the apparatus of the invention, showing a relationship between the ratio of returned powder and the metal lead content of the product powder.

FIG. 3 shows content of red lead in the product powder (available at the outlet of the kiln) for a given amount of input raw material, versus the ratio of returned powder to the input (recycle ratio). These are attained by the apparatus shown in FIGS. 1 and 2. As shown in FIG. 3, a higher red lead yield can be obtained when a part of the powder caught by the bag filter is returned to the inlet port (Case 2) than when a part of the product powder available at the outlet is directly returned to the inlet port (Case 1).

Furthermore, in addition to the means shown above, the addition of drops of water to the powder at the inlet port could be an effective means for attaining more stable red lead production. This is because the addition of drops of water not only removes the heat at the inlet port but oxidizes the metal lead at a lower temperature.

As above described, the present invention offers a new and high yield red lead manufacturing method and apparatus by returning a part of the product powder available at the outlet of the rotary kiln, or a part of the fine powder caught by a bag filter, to the inlet port of the rotary kiln.

What is claimed is:

1. A method of making red lead, comprising:
supplying a mixture of metal lead powder and lead monoxide powder into a horizontally disposed rotating inner cylinder of a kiln through an inlet of said kiln in order to bake said mixture of metal lead powder and lead monoxide powder to form a product powder as said mixture is gradually transported toward an outlet of said rotating inner kiln cylinder by its rotation;
returning a part of said product powder obtained at said kiln outlet to said kiln inlet; and
dissociating into lead monoxide at least a portion of said product powder in said rotating inner cylinder of said kiln.

2. A method of making red lead according to claim 1, wherein said product powder returned to said kiln inlet is powder caught by a dust collecting bag filter provided at said kiln outlet.

3. A method of making red lead according to claim 2, wherein said product powder collected by said bag filter returned to said kiln inlet is powder having an average particle size of less than one micron.

* * * * *